United States Patent
Stoyanov et al.

(10) Patent No.: US 11,739,842 B2
(45) Date of Patent: *Aug. 29, 2023

(54) HIGH PRESSURE COMPRESSOR SEAL-RING WITH IMPROVED WEAR RESISTANCE

(71) Applicant: Raytheon Technologies Corporation, Farmington, CT (US)

(72) Inventors: Pantcho P. Stoyanov, West Hartford, CT (US); Kelly M. Harrington, Deerfield, NH (US)

(73) Assignee: Raytheon Technologies Corporation, Farmington, CT (US)

( * ) Notice: Subject to any disclaimer, the term of this patent is extended or adjusted under 35 U.S.C. 154(b) by 5 days.

This patent is subject to a terminal disclaimer.

(21) Appl. No.: 17/366,259

(22) Filed: Jul. 2, 2021

(65) Prior Publication Data

US 2021/0372525 A1     Dec. 2, 2021

Related U.S. Application Data

(63) Continuation of application No. 16/269,673, filed on Feb. 7, 2019, now Pat. No. 11,149,854.

(51) Int. Cl.
*F16J 15/16* (2006.01)
*F02C 7/28* (2006.01)

(52) U.S. Cl.
CPC ............ *F16J 15/162* (2013.01); *F02C 7/28* (2013.01); *F05D 2220/32* (2013.01); *F05D 2240/59* (2013.01)

(58) Field of Classification Search
CPC .. F16J 15/162; F16J 15/16; F16J 15/50; F16J 15/52; F16J 15/324; F16J 15/3404; F16J 15/40; F16J 15/164; F02C 7/28; F02C 7/30; F02C 7/32; F05D 2220/30; F05D 2220/00; F05D 2220/321; F05D 2220/3212; F05D 2220/3213; F05D 2220/3215–3219; F05D 2240/59; F05D 2240/55
USPC .......................................................... 277/300
See application file for complete search history.

(56) References Cited

U.S. PATENT DOCUMENTS

| | | | |
|---|---|---|---|
| 4,152,223 A | 5/1979 | Borstein et al. | |
| 4,750,746 A | 6/1988 | Boudot et al. | |
| 8,082,899 B2 * | 12/2011 | Kuroda | C10M 111/04 123/193.6 |
| 9,957,826 B2 * | 5/2018 | Novikov | C04B 35/5622 |
| 9,995,161 B2 * | 6/2018 | Kelly | F01D 11/003 |
| 2011/0027573 A1 * | 2/2011 | Strock | C23C 28/3215 428/319.1 |
| 2012/0211944 A1 * | 8/2012 | Nishimoto | F16J 15/442 277/422 |

(Continued)

OTHER PUBLICATIONS

U.S. Non-Final Office action for U.S. Appl. No. 16/269,673 dated Jul. 7, 2020.

(Continued)

*Primary Examiner* — Nathan Cumar
(74) *Attorney, Agent, or Firm* — Bachman & LaPointe, P.C.

(57) ABSTRACT

A compressor seal-ring assembly includes a seal formed of a nickel, cobalt or iron-based superalloy; a counterface positioned for sealing interaction with the seal; and a lubricant coating on the seal, the lubricant coating being formed of a CoCrAlY-containing material.

20 Claims, 3 Drawing Sheets

(56) References Cited

U.S. PATENT DOCUMENTS

| | | | | |
|---|---|---|---|---|
| 2013/0051993 | A1* | 2/2013 | Webb | F01D 11/005 415/173.7 |
| 2015/0093237 | A1* | 4/2015 | Delvaux | F01D 5/282 451/28 |
| 2016/0169020 | A1* | 6/2016 | Ryan | F01D 9/041 415/173.3 |
| 2018/0291815 | A1* | 10/2018 | Munson | F01D 11/003 |

OTHER PUBLICATIONS

U.S. Non-Final Office action for U.S. Appl. No. 16/269,673 dated Nov. 13, 2020.
European search report for application No. 20 15 6101 dated May 13, 2020.

* cited by examiner

HIGH PRESSURE COMPRESSOR SEAL-RING WITH IMPROVED WEAR RESISTANCE

CROSS REFERENCE TO RELATED APPLICATION

This application is a continuation application of U.S. patent application Ser. No. 16/269,673, filed Feb. 7, 2019.

BACKGROUND

The present disclosure relates to a compressor seal-ring assembly and, more particularly, to a high-pressure compressor seal-ring assembly with a coating system to improve wear resistance.

Gas turbine engines typically include compressors having multiple rows, or stages, of rotating blades and multiple stages of stators. In some parts of the gas turbine engine, it is desirable to create a seal between two volumes. For example, a first volume can define a portion of the gas path which receives relatively hot fluid. Fluid within a second volume can be used to cool components of the gas turbine engine and, thus, have a lower temperature than the fluid within the first volume. A seal can be used to seal the first volume from the second volume as some parts defining the first and/or second volume move and/or rotate with respect to other parts defining the first and/or second volume.

One specific location of a seal in such an engine is between components of a high-pressure compressor, for example between a rotor such as an integrated blade rotor (IBR) and a shaft on which the IBR is positioned.

In some high pressure compressor piston-seals, operation is carried out at elevated temperatures and conditions of high vibratory motion. Existing seal rings are typically manufactured from, or provided having outer surfaces of, a nickel superalloy such as IN718, which can typically be coated with a copper aluminum alloy. The corresponding surface of the IBR is typically fabricated from a nickel based superalloy such as DA718. Due to poor tribological behavior of these alloys in combination with the high temperature exposure and high vibratory energy in the system, these materials are not capable of effectively operating under the harsh conditions, continuously resulting in premature failure of the seal due to wear issues.

In addition to the need to constantly replace such seals after excessive wear, this situation can also frequently cause costly damage to other parts, such as to the counterface of the IBR, which is a critical and expensive part.

The present disclosure is directed to addressing this issue.

SUMMARY OF THE INVENTION

A compressor seal-ring assembly according to one embodiment of the present disclosure comprises a seal comprising a nickel, cobalt or iron-based superalloy; a counterface positioned for sealing interaction with the seal; and a lubricant coating on the seal, the lubricant coating comprising a CoCrAlY-containing material.

In one non-limiting embodiment, the lubricant coating has a thickness of between 0.001 and 0.006 inches.

In another non-limiting embodiment, the lubricant coating has a thickness of between 0.003 and 0.005 inches.

In a further non-limiting embodiment, the lubricant coating comprises between 75 and 98% wt. of CoCrAlY and between 2 and 25% wt. of hBN.

In still another non-limiting embodiment, the assembly further comprises an additional lubricant coating on the counterface.

In a still further non-limiting embodiment, the additional lubricant coating comprises hBN.

In another non-limiting embodiment, the additional lubricant coating has a thickness of between 0.0001 and 0.002 inches.

In a further non-limiting embodiment, the additional lubricant coating has a thickness of between 0.0005 and 0.001 inches.

In another non-limiting embodiment, the additional lubricant coating is a solid lubricant paste.

In still another non-limiting embodiment, the solid lubricant paste contains <10% wt. of binder constituents.

In another non-limiting embodiment, the counterface is a surface of a rotor, and the seal is mounted between the rotor and an outer shaft on which the rotor is mounted.

In a further non-limiting embodiment, the rotor is a component of a high pressure compressor of a gas turbine engine.

In a non-limiting embodiment, a method for improving wear resistance of a compressor seal-ring assembly comprises positioning a seal comprising a nickel, cobalt or iron-based superalloy for sealing interaction with a counterface, wherein the seal has a lubricant coating comprising a CoCrAlY material; and moving the counterface relative to the seal to deposit a transfer coating from the lubricant coating on the counterface.

In another non-limiting embodiment, the transfer coating creates a Co—Co interface between the seal and the counterface.

In a further non-limiting embodiment, the counterface is a surface of a rotor.

In still another non-limiting embodiment, the method further comprises applying an additional lubricant coating to the counterface.

In a still further non-limiting embodiment, the additional lubricant coating comprises hBN.

In another non-limiting embodiment, the additional lubricant coating is applied as a solid lubricant paste, and the method further comprises curing the solid lubricant paste to produce the additional lubricant coating.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

A detailed description of preferred embodiments of the present disclosure follows, with referenced to the attached drawings, wherein.

DETAILED DESCRIPTION

The disclosure relates to a compressor seal-ring assembly and more particularly to a coating system for use with a seal ring and associated rotor such as an integrated blade rotor (IBR).

Figure 1:
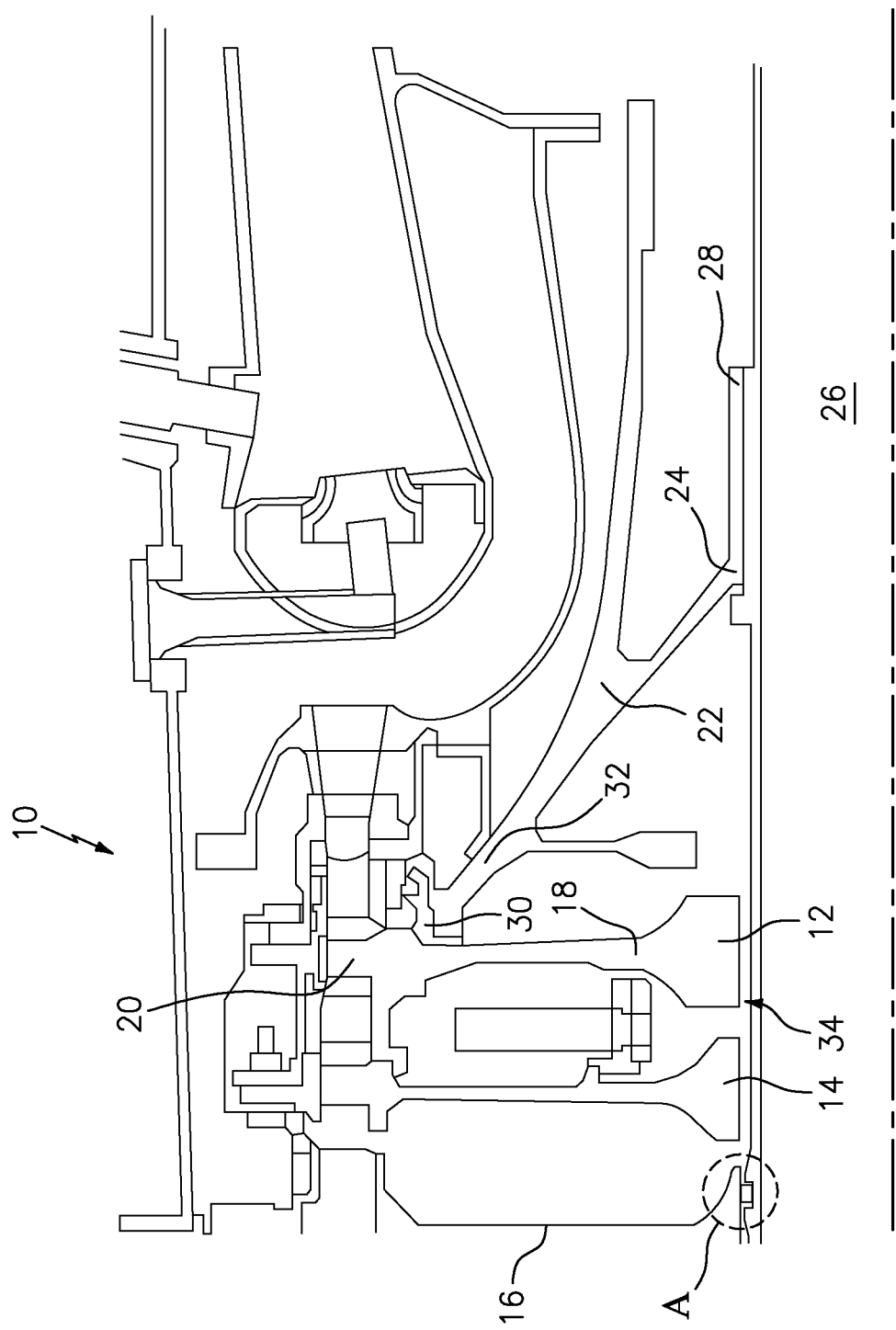
FIG. 1 illustrates a portion of a gas turbine engine showing the environment surrounding a seal assembly of the present disclosure.

FIG. 1 shows high pressure compressor 10 which includes a plurality of integrally bladed rotors (IBR) including IBRs 12, 14, 16. IBR 12 includes a rotor disk portion 18 and a blade portion 20. Rotor disk portion 18 and blade portion 20 are portions of a single component. Similar components are present in the other IBRs as well.

High pressure compressor 10 includes a hub rotor 22 having a radially inner arm 24 coupled to outer shaft 26 via an engine nut 28. A seal ring 30 is positioned between an outer arm 32 of hub rotor 22 and a portion of rotor disk portion 18 of IBR 12. A rotor stack 34 (including IBRs 12, 14 and 16 as well as other IBRs of high pressure compressor 10) of high pressure compressor 10 is coupled to outer shaft 26 at a location forward of IBR 16. In that regard, rotor stack 34 and seal ring 30 are held in place via compressive force applied via the coupling of rotor stack 34 to outer shaft 26 at the forward location and via the coupling of hub rotor 22 to outer shaft 26. Compressive force is defined as a force applied to an object from two sides that does not necessarily cause the object to reduce in size, quantity or volume. Stated differently, seal ring 30 is held in place by compressive force applied to seal ring 30 as a result of a forward force applied by hub rotor 22 and an aftward force applied by IBR 12. In that regard, seal ring 30 can be press fit into place between outer arm 32 of hub rotor 22 and rotor disk portion 18 of IBR 12.

Figure 2:
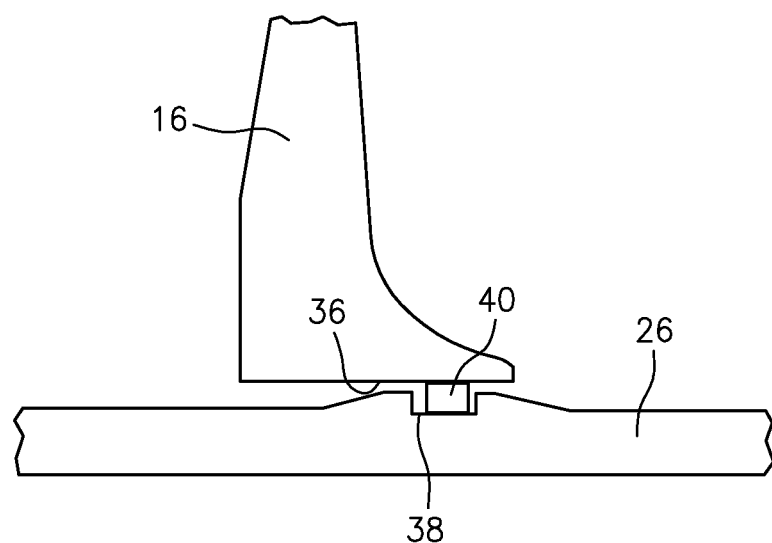
FIG. 2 is an enlarged portion of FIG. 1 showing a non-limiting embodiment of the disclosed seal assembly.

IBR 16 is shown sealed against outer shaft 26 at the portion circled at A, which is enlarged in FIG. 2.

FIG. 2 shows IBR 16, and specifically a counterface 36 of IBR 16, as well as a portion of outer shaft 26 against which a seal is needed. As shown, a radially outwardly facing groove 38 can be defined on outer shaft 26, and a seal 40 can be disposed in groove 38 for sealing against counterface 36. In this location, seal 40 is considered a high pressure compressor piston-seal. Lubrication of the interface between seal 40 and counterface 36 is the focus of the present disclosure.

Figure 3A:
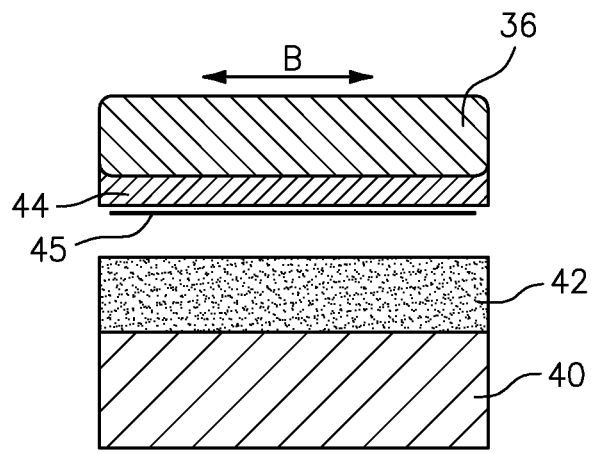
FIGS. 3A and B show cross-sections taken through a seal and counterface of a compressor seal-ring assembly according to two different embodiments of the present disclosure.
Figure 3B:
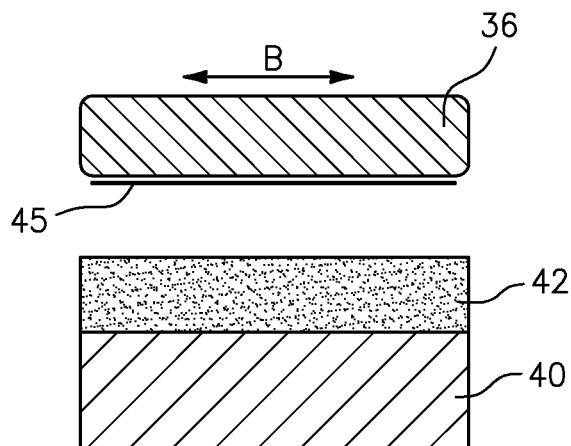

FIG. 3 is an enlarged view of the interface between seal 40 and counterface 36. At this location, a high energy vibratory motion is encountered by the seal and counterface, which is schematically represented by arrow B. This vibratory motion, especially at the elevated temperatures to which this area is subjected, namely between about 350 and 900° F., can lead to rapid failure or at least wear of seal 40, which can in turn lead to damage to counterface 36 of the IBR, which leads to costly overhaul.

In high detail photography of a conventional seal and corresponding IBR surface after a certain amount of operation of these components at high temperatures and high conditions of vibratory energy, the surface of the seal is worn and damaged, and a corresponding portion of the surface of the IBR is also visibly pitted and worn in a manner which can require expensive and time-consuming repair and/or replacement. The lubricant system disclosed herein addresses this problem.

Seal 40 is typically a ring seal which can be fabricated from a nickel, cobalt or iron superalloy. Specific non-limiting examples of suitable material include IN 718 nickel superalloy, Haynes 25 cobalt alloy and A286 iron based superalloy, and numerous other examples of other suitable materials would be well known to a person having ordinary skill in the art.

The counterface 36 of IBR 16 can typically be fabricated from a nickel based superalloy such as DA718. This material would typically be the material from which at least this portion of the IBR is fabricated.

In conventional seals, a coating is produced on the seal, wherein the conventional coating is a copper aluminum alloy. This coating has been found to be insufficient, and results in the unacceptable wear discussed above. Therefore, as disclosed herein, a coating 42 (FIG. 3) can be applied to seal 40, wherein the coating 42 is a lubricant coating that reduces friction and wear between seal 40 and counterface 36 due to excessive heat and vibratory movement or fretting. This lubricant coating, in the disclosed embodiment, is applied to an outer radius of the ring shaped seal so as to be positioned for sealing interaction with counterface 36.

Lubricant coating 42 is advantageously provided from a CoCrAlY alloy, which can advantageously be blended with hBN. A specific example of a suitable blend of these materials is AMDRY-958 provided by Oerlikon Metco which is a particularly well-suited lubricant coating for use in the seal system of the present disclosure. The lubricant coating in this non-limiting embodiment can by provided as a mixture of between about 75 and 98% wt. CoCrAlY and between about 2 and 25% wt. hBN, although other ratios of components can also be utilized. One particularly suitable blend is 85% wt. CoCrAlY and 15% wt. hBN. Further, lubricant coating 42 advantageously has a thickness of between about 0.001 and about 0.006 inches, preferably between about, more preferably between 0.003 and 0.005 inches.

Lubricant coating 42 can advantageously be produced on seal 40 in numerous different ways, but one particularly well suited but non-limiting example of application method is through plasma spray.

In a further non-limiting embodiment, counterface 36 can also be provided with an additional lubricant coating 44. Additional lubricant coating 44 can be hBN or an hBN-based solid lubricant paste, which can be applied to counterface 36. This additional lubricant coating helps to further reduce friction between counterface 36 and seal 40. The solid lubricant may suitably contain less than about 10% wt. of binder constituents. This coating can have a thickness of between about 0.0001 and about 0.002, preferably between 0.0005 and 0.001 inches.

The additional lubricant coating can be applied to IBR counterface 36 by brushing or swabbing, as non-limiting examples. Alternatively, the additional lubricant coating can be applied by spraying, or other suitable methods. When applied as a solid lubricant paste, the paste can then suitable be cured at elevated temperature to produce the desired additional lubricant coating.

Lubricant coating 42 alone produces an improved sliding regime between the seal ring 40 and counterface 36 as compared to the conventional structures mentioned above. This serves to reduce overall wear of the interface between the seal and counterface. Further, adding additional lubricant coating 44 to counterface 36 of the IBR even further reduces overall wear at the interface, and thereby can greatly reduce the cost and frequency of repair and overhaul of these components.

Additional lubricant coating 44 can also reduce the breaking-in period between the surfaces. More specifically, upon initial motion, basal planes of the additional lubricant coating (hBN) become parallel to the sliding direction, thereby reducing the coefficient of friction.

Figure 4:
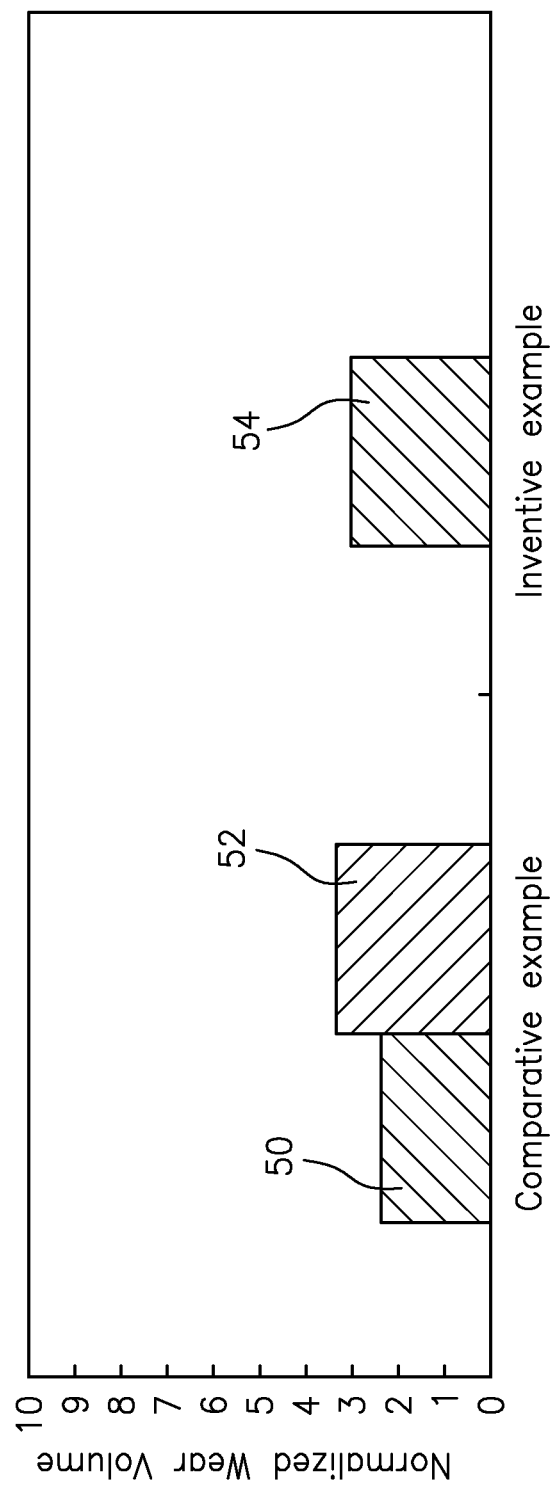
FIG. 4 illustrates the wear results of the presently disclosed system as compared to a prior art system as discussed above.

Wear volume was measured for a prior art coating system having a copper aluminum alloy coating on the seal, and also for a coating system of the present disclosure including an 85%/15% lubricant coating of CoCrAlY and hBN as discussed above, applied to the seal with no additional coating on the IBR. These tests were conducted on a custom build rig with a pin-on-flat configuration. FIG. 4 shows the results of this testing in terms of normalized wear volume for piston seal coating and counterface of the IBR. In FIG. 4, data on the left side of the drawing shows wear of the piston seal-coating at 50, and wear of the counterface of the IBR at 52. As shown, there was considerable wear to the IBR. On the right side of the drawing, wear on the piston seal-coating of the inventive coating system is shown at 54, and there was no measurable wear to the IBR counterface.

In the left side of FIG. 4, using conventional seal and coating, significant wear volume is shown, for both components. In the right-side portion of FIG. 4, it can be seen that the wear volume is slightly higher on the piston seal/coating side, but is virtually eliminated on the counterface side. The slight increase in piston seal-coating wear is accounted for by creation of a transfer coating 45 (See FIGS. 3A and 3B) on the counterface surface of the IBR. This is desirable, as the transfer coating consists of cobalt from the CoCrAlY lubricant coating which is positioned on the seal, and this transfer coating creates a cobalt-cobalt sliding regime between the seal and counterface. This sliding regime is subject to extremely low friction and greatly reduces or eliminates wear problems due to the high vibratory energy encountered in this interface, as well as the high temperatures. Thus, the lubricant system of the present disclosure greatly reduces or eliminates wear to the expensive IBR component.

It should be noted that the testing conducted as represented in FIG. 4 was conducted without utilizing the additional lubricant coating on the counterface or IBR side as discussed above. With this optional additional lubricant coating, the wear can be even more greatly reduced.

Low friction and wear resistant piston seals or rings as disclosed herein are capable of operating efficiently in high pressure compressor static sealing applications and will significantly increase the endurance life of engine components. In addition, this technology may significantly reduce overhaul costs by reducing the number of parts (in particular the more-expensive counterparts) that are stripped due to wear and thermal damage issues (e.g. caused by frictional heating).

One or more embodiments of the present invention have been described. Nevertheless, it will be understood that various modifications may be made without departing from the spirit and scope of the invention. For example, the disclosed lubricant coatings can be applied at other similar locations within a gas turbine engine and produce benefits from such application as well. Further, the coating materials disclosed herein and their equivalents can be utilized with components of different underlying materials, all within the broad scope of the disclosure. Accordingly, other embodiments are within the scope of the following claims.

What is claimed is:

1. A compressor seal-ring assembly, comprising:
   a seal comprising a nickel, cobalt or iron-based superalloy;
   a counterface positioned for sealing interaction with the seal, wherein the seal and counterface define a static seal; and
   a lubricant coating on the seal, the lubricant coating comprising a CoCrAlY-containing material.

2. The assembly of claim 1, wherein the lubricant coating has a thickness of between 0.001 and 0.006 inches.

3. The assembly of claim 1, wherein the lubricant coating has a thickness of between 0.003 and 0.005 inches.

4. The assembly of claim 1, wherein the lubricant coating comprises between 75 and 98% wt. of CoCrAlY and between 2 and 25% wt. of hBN.

5. The assembly of claim 4, wherein the additional lubricant coating is a solid lubricant paste.

6. The assembly of claim 5, wherein the solid lubricant paste contains <10% wt. of binder constituents.

7. The assembly of claim 1, further comprising an additional lubricant coating on the counterface.

8. The assembly of claim 7, wherein the additional lubricant coating comprises hBN.

9. The assembly of claim 7, wherein the additional lubricant coating has a thickness of between 0.0001 and 0.002 inches.

10. The assembly of claim 7, wherein the additional lubricant coating has a thickness of between 0.0005 and 0.001 inches.

11. The assembly of claim 1, wherein the counterface is a surface of a rotor, and the seal is mounted between the rotor and an outer shaft on which the rotor is mounted.

12. The assembly of claim 11, wherein the rotor is a component of a high pressure compressor of a gas turbine engine.

13. The assembly of claim 1, wherein the lubricant coating comprises CoCrAlY and hBn.

14. A method for improving wear resistance of a compressor seal-ring assembly, comprising:
   positioning a seal comprising a nickel, cobalt or iron-based superalloy for sealing interaction with a counterface, wherein the seal and the counterface define a static seal and wherein the seal has a lubricant coating comprising a CoCrAlY material; and
   moving the counterface relative to the seal to deposit a transfer coating from the lubricant coating on the counterface, wherein the moving comprises a vibratory motion of the seal relative to the counterface.

15. The method of claim 14, wherein the transfer coating creates a Co—Co interface between the seal and the counterface.

16. The method of claim 14, wherein the counterface is a surface of a rotor.

17. The method of claim 14, further comprising the step of applying an additional lubricant coating to the counterface.

18. The method of claim 17, wherein the additional lubricant coating comprises hBN.

19. The method of claim 17, wherein the additional lubricant coating is applied as a solid lubricant paste, and further comprising curing the solid lubricant paste to produce the additional lubricant coating.

20. The method of claim 14, wherein the lubricant coating comprises CoCrAlY and hBn.

* * * * *